(12) United States Patent
Fan

(10) Patent No.: US 10,620,491 B2
(45) Date of Patent: Apr. 14, 2020

(54) LIQUID CRYSTAL ON SILICON PACKAGING

(71) Applicant: OmniVision Technologies, Inc., Santa Clara, CA (US)

(72) Inventor: Chun-Sheng Fan, Zhudong Township (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/658,338

(22) Filed: Oct. 21, 2019

(65) Prior Publication Data

US 2020/0050044 A1 Feb. 13, 2020

Related U.S. Application Data

(62) Division of application No. 15/707,988, filed on Sep. 18, 2017, now Pat. No. 10,488,721.

(51) Int. Cl.
*G02F 1/1333* (2006.01)
*G02F 1/1345* (2006.01)
*G02F 1/1362* (2006.01)

(52) U.S. Cl.
CPC .... *G02F 1/13452* (2013.01); *G02F 1/136277* (2013.01); *G02F 2202/28* (2013.01)

(58) Field of Classification Search
None
See application file for complete search history.

(56) References Cited

U.S. PATENT DOCUMENTS

| 2002/0085158 A1* | 7/2002 | Armagost ........... G02F 1/13452 349/149 |
| 2013/0242243 A1 | 9/2013 | Supon |
| 2016/0231604 A1 | 8/2016 | Lin |
| 2018/0113351 A1 | 4/2018 | Wada |

* cited by examiner

Primary Examiner — Richard H Kim

(57) ABSTRACT

A method of fanning an electrical connection in a liquid crystal on silicon (LCOS) device, comprising: providing a silicon substrate including a first surface and a second surface, wherein the silicon substrate includes an conductive pad at the first surface; providing a cover glass panel that includes a cover glass, a transparent electrode layer formed upon the cover glass, and a first sealing material layer formed upon the transparent electrode layer; forming a second sealing material layer upon the first surface of the silicon substrate, wherein the second sealing material layer covers the conductive pad; forming a display layer, comprising a liquid crystal portion, a first seal portion, and a second seal portion, upon the second sealing material layer; wherein the first seal portion and the second seal portion are situated to form a space between them; and wherein the space is situated on top of the conductive pad; placing the cover glass panel upon the display layer, wherein the first sealing material layer is placed directly in contact with the display layer; singulating the cover glass panel, the display layer, and the silicon substrate, through the space between the first seal portion and the second seal portion, wherein the first seal portion is separated from the second seal portion; subsequently dispensing a conductive adhesive to the cover glass panel and the silicon substrate, wherein the conductive adhesive forms an electrical connection between transparent electrode layer and the conductive pad.

4 Claims, 7 Drawing Sheets

LIQUID CRYSTAL ON SILICON PACKAGING

CROSS-REFERENCE TO RELATED APPLICATION

This application is a divisional application of U.S. patent application Ser. No. 15/707,988, filed Sep. 18, 2017.

TECHNICAL FIELD

This disclosure relates flat panel display (FPD) technology, and more particularly, to liquid crystal on silicon (LCOS) display panels and the manufacturing methods thereof.

BACKGROUND INFORMATION

A liquid crystal on silicon (LCOS) panel employs semiconductor technology to control liquid crystal orientation to project color images. LCOS panels have become a prominent type of reflective-projective device, and have various advantages when compared with transmission-type liquid crystal (LCD) displays and digital light procession (DLP) panels. Such advantages include higher light utilization, higher contrast image, smaller size, higher aperture ratio, and mature fabrication technology. They can easily achieve high resolution and satisfying color performance. These advantages give LCOS panels a predominant status in the application field of large scale displays.

Current manufacturing methods, particularly those relating to forming electrical couplings among various LCOS components, lack a desirable level of stability and reliability, and are in need of improvement.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Figure 1:
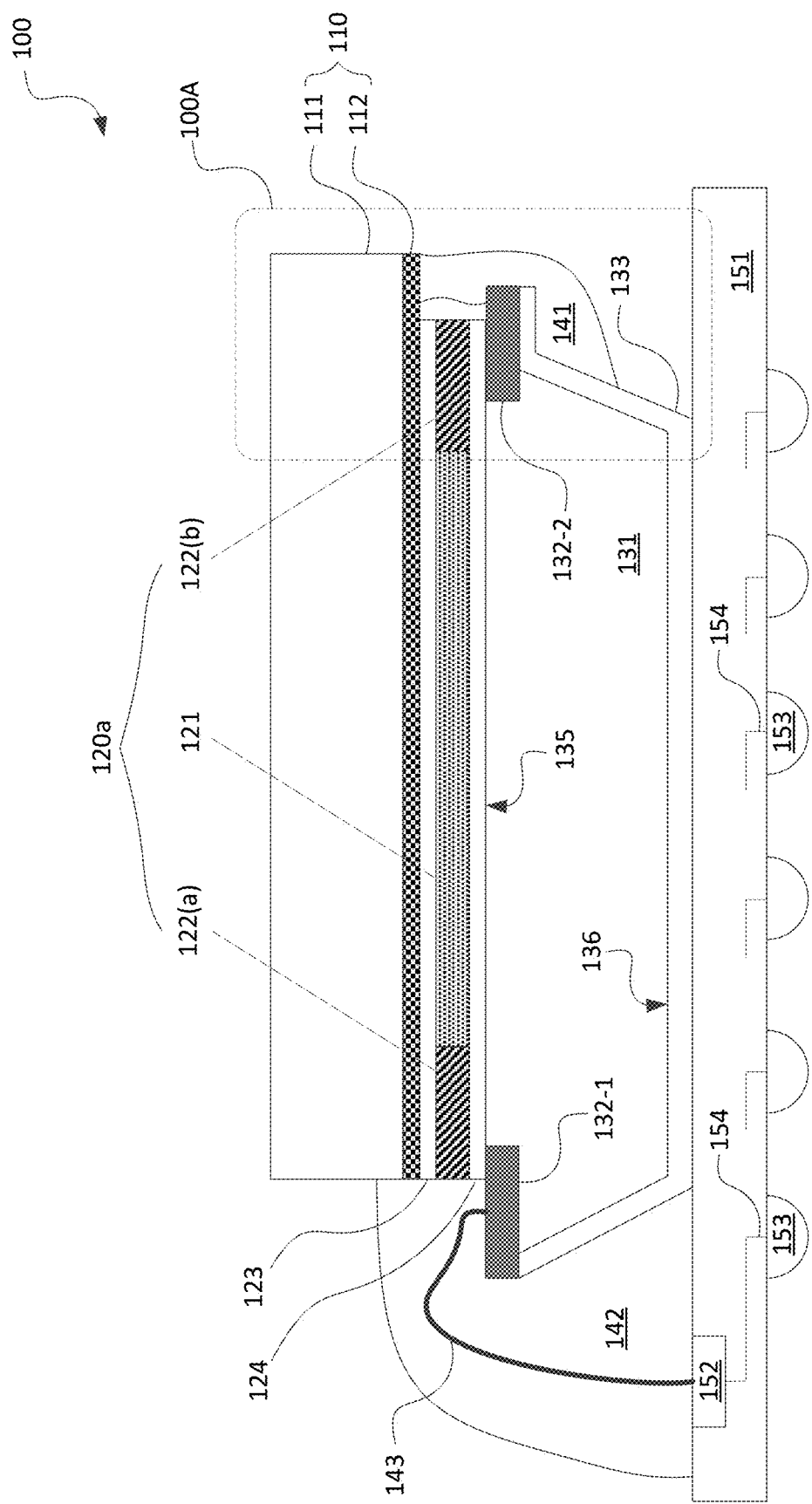
FIG. 1 is a cross sectional side view of an embodiment of an LCOS display panel device.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth to provide a thorough understanding of the examples. One skilled in the relevant art will recognize; however, that the techniques described herein can be practiced without one or more of the specific details, or with other methods, components, materials, etc. In other instances, well-.known structures, materials, or operations are not shown or described in detail to avoid obscuring certain aspects.

Reference throughout this specification to "example" or "embodiment" means that a particular feature, structure, or characteristic described in connection with the example is included in at least one example of the present invention. Thus, the appearances of "example" or "embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise.

U.S. Pat. No. 9,229,280 is incorporated by reference in its entirety herein.

LCOS Panel Embodiment

FIG. 1 is a cross sectional side view of a liquid crystal on silicon (LCOS) display panel device 100, which comprises a silicon substrate member 131, a display layer member 120a, a cover glass panel member 110, and a printed circuit board (PCB) member 151.

The silicon substrate member 131 is made of silicon, and includes a first surface 135 and a second surface 136 as shown. The silicon substrate member 131 also includes a first conductive pad 132-1 at its left side, and a second conductive pad 132-2 at its right side, as shown in FIG. 1. These conductive pads are made of electrically conductive materials, such as metals. The first and second conductive pads 132-1 and 132-2 are part of the silicon substrate member 131, and are situated at the first surface 135 as shown The second surface 136 of the silicon substrate may be covered with an isolation layer of insulating material 133, which may be made of a black solder mask (BSM), and is not electrically conductive.

The display layer member 120a includes a liquid crystal portion 121 disposed on the first silicon substrate surface 135 as a flat layer, and a seal member 122 that surrounds the liquid crystal portion 120. As an example, the seal member 122 forms a closed ring around the liquid crystal portion 121. FIG. 1 shows a left part 122(a) and a right part 122(b) of the seal member 122 in a cross sectional view. This is consistent with the closed ring shape of the seal member 122 as viewed in its cross sectional side view. The liquid crystal portion 121 defines the display area of the LCOS display panel device 100.

As shown in FIG. 1, the display layer member 120a may further include a first sealing material layer 123 and a second sealing material layer 124, which are situated at the top and bottom sides of the liquid crystal portion 121 (and the seal member 122), respectively. The first and second sealing material layers 123 and 124 may each be made of a polymeric material such as polyimide (PI), and may be alternatively referred to as PI layers. Together with the seal member 122, the two sealing material layers 123 and 124 function to isolate and seal off the liquid crystal portion 121. Since the seal member 122 rests upon the second sealing material layer 124, the sealing of the liquid crystal portion is tighter than if the seal 122 does not rest upon the second sealing material layer 124. The display layer member 120*a* is situated on top of the first surface 135 of the silicon substrate member 131.

The cover glass panel 110 includes a transparent cover glass 111 and a transparent electrode layer 112. The transparent electrode layer 112 is typically made of indium tin oxide (ITO), and is alternatively referred to as an ITO layer. The ITO conducts electricity like a metal, but unlike a typical metal, it is transparent. Together with the cover glass 111, the ITO layer 112 ensures that the cover glass panel 110 is transparent to incoming light. This transparency is needed for a reflective type device such as the LCOS panel 100 to work properly. The cover glass panel 110 is situated on top of the first sealing material layer 123 of the display layer member 120*a*.

It is appreciated that the display layer member 120*a* is sandwiched between the cover glass panel 110 and the silicon substrate 131. More specifically, the liquid crystal portion 121 is sandwiched between the transparent electrode layer 112 and the first surface 135 of the silicon substrate 131. It is further appreciated that there may be a third electrically conductive pad (not shown) located between the first and second conductive pads 132-1 and 132-2 in the silicon substrate 131. This third conductive pad is situated at the first silicon substrate surface 135, and directly underneath essentially the entirety of the liquid crystal portion 121. Both the transparent conductive electrode layer 112 on the top, and first silicon substrate surface 135 containing the third conductive pad at the bottom, may function together to exert an external electrical field throughout the liquid crystal portion 121, so as to affect the alignment of the liquid crystal molecules therein, which in turn affects the reflectivity of the liquid crystal portion 121. This provides an essential working basis of the LCOS display panel device 100.

The second surface 136 of the silicon substrate 131 (or the isolation layer of insulating material 133) is situated upon the PCB member 151, which includes a conductive bonding pad 152, a number of conductive solder balls 153, and at least one internal electrical connection 154 that couples the bonding pad 152 to the solder ball 153, as shown. The rest of the PCB 151 is typically made of resin, and is not electrically conductive.

A conductive member 143, such as a metal wire, electrically couples the first conductive pad 132-1 of the silicon substrate 131 with the bonding pad 152 of the PCB member 151. This establishes an electrical connection between the silicon substrate 131 and the PCB member 151. Through the internal connection 154, the first conductive pad 132-1 is electrically coupled to the solder ball 153. As shown in FIG. 1, an encapsulating material 142 may cover the conductive member 143, the first conductive pad 132-1, and the bonding pad 152. The encapsulating material 142 may be a resin-type material, which provides physical protection and moisture resistance o the components under its cover.

A conductive adhesive 141 may electrically couple the second conductive pad 132-2 with the transparent electrode layer 112. This establishes an electrical connection between the silicon substrate 131 and the cover glass panel 110. Conventional manufacturing methods to form this connection suffer from a lack of stability and reliability, and are in need of improvement. A dotted line box 100A highlights a right hand side portion of the LCOS display panel 100 that has this type of connection. Exemplary manufacturing methods are disclosed herein to illustrate improvements of making an electrical connection between the second conductive pad 132-2 and the transparent electrode layer 112.

LCOS Manufacturing Method Embodiment

FIGS. 2A through 2M show cross sectional side views of the steps of an exemplary embodiment of an LCOS device manufacturing process, specifically forming an electrical coupling between the transparent electrode layer 112 and the second conductive pad 132-2 on a silicon substrate 131 as shown in FIG. 1. It is appreciated that the numbering of some parts in FIGS. 2A through 2M are the same as in FIG. 1. This is meant to indicate that the same part numbers in FIGS. 2A-2M and FIG. 1 denote the same part entity.

Figure 2A:
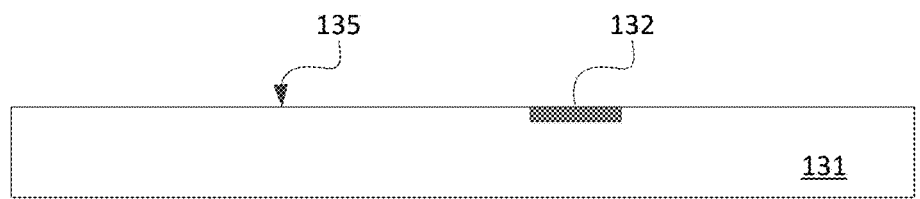
FIGS. 2A through 2M are cross sectional side views of an exemplary embodiment of an LCOS device manufacturing process, specifically forming an electrical coupling between a transparent electrode layer and a conductive pad on a silicon substrate.

As shown in FIG. 2A, in a first step, a silicon substrate 131 having a first surface 135 and a second surface 136 is provided. It is appreciated that the silicon substrate 131 includes a conductive pad 132 that is part of the silicon substrate 131, and is situated at the first surface 135 as shown. The conductive pad 132 in FIGS. 2A-2M is the same as the second conductive pad 122-2 in FIG. 1.

Figure 2B:
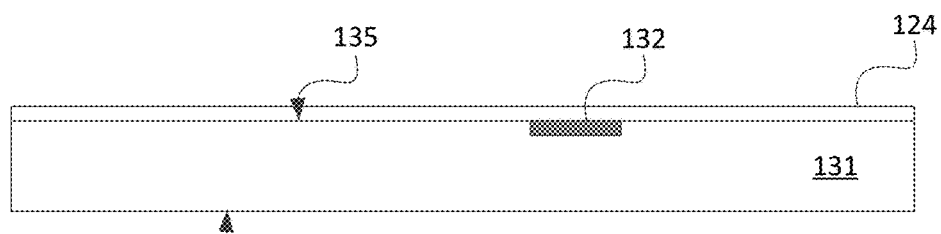

Next in FIG. 2B, a second sealing material layer 124 is formed upon the first surface 135. Since the conductive pad 132 is situated at the first surface 135, the second sealing material layer 124 is formed upon the conductive pad 132. The second sealing material layer 124 may be made of a polymeric material such as polyimide (PI), and may be alternatively referred to as a PI layer. The second surface 136 is left uncoated at this step.

Figure 2C:
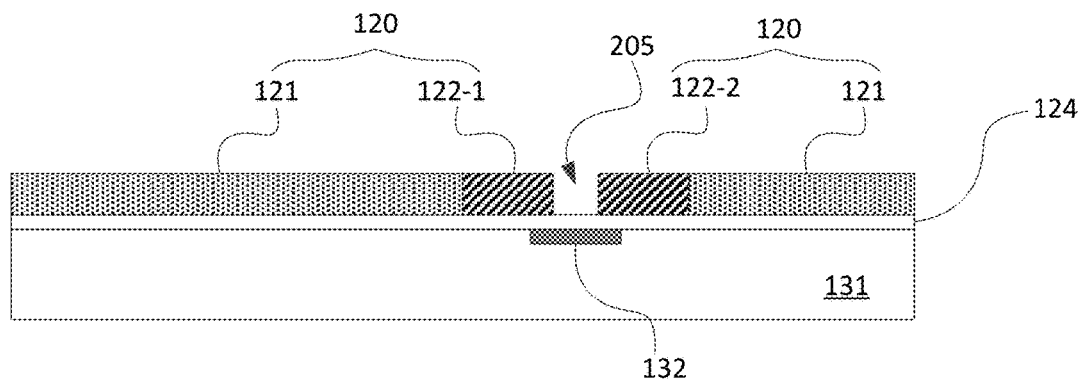

In a subsequent step shown in FIG. 2C, a display layer 120 is formed on the second sealing material layer 124, wherein the display layer includes a first seal portion 122-1 and a second seal portion 122-2, each surrounding a liquid crystal portion 121. Several issues need to be addressed to clarify the depiction in FIG. 2C. First, the two seal portions 122-1 and 122-2 are two separate seals. Second, in a cross sectional side view, each seal should show two parts such as 122(*a*) and 122(*b*) in FIG. 1. However, in this FIG. 2C, only the right part of the seal 122-1 is shown while the left part is not shown; only the left part of the seal 122-2 is shown while the right part is not shown. This is an arbitrary choice of drawing. Third, each of the first and second seals 122-1 and 122-2 forms an enclosed ring to completely surround a liquid crystal portion 121, even though FIG. 2C shows only partial enclosures.

It is appreciated that the first seal portion 122-1 and the second seal portion 122-2 are situated such that a space 205 is formed between them, wherein this space 205 is situated directly on top of the conductive pad 132, as shown in FIG. 2C.

Figure 2D:
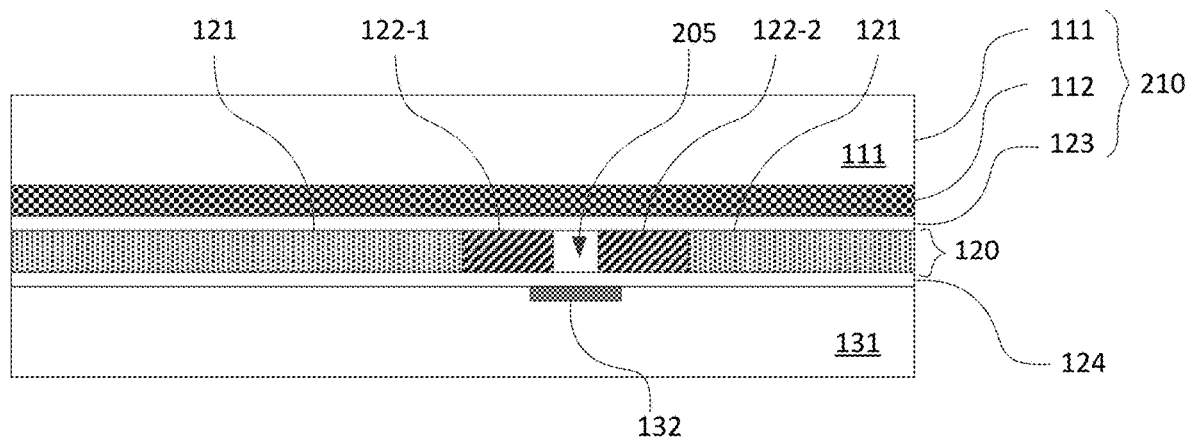

Next in FIG. 2D, a cover glass panel 210 is first provided, and is then placed upon the display layer 120. The cover glass panel 210 includes a transparent cover glass 111, a transparent electrode layer 112 that is formed upon the cover glass 111, and a first sealing material layer 123 that is formed upon the transparent electrode layer 112. The transparent cover glass panel 210 is similar to the transparent cover glass panel 110 in FIG. 1, except that here in FIG. 2D, the transparent cover glass panel 210 also includes the first sealing material layer 123, whereas in FIG. 1, the transparent cover glass panel 110 only includes the transparent cover glass 111 and the transparent electrode layer 112. This discrepancy is only an arbitrary choice of organizing subcomponents.

Similar to the second sealing material layer 124, the first sealing material layer 123 may also be made of a polymeric material such as polyimide (PI), and may be alternatively referred to as a PI layer.

After the cover glass panel 210 is placed upon the display layer 120, each of the first and second seal portions 122-1 and 122-2, along with the two sealing material layers 123 and 124, functions to isolate and seal off the liquid crystal portions 121, as shown in FIG. 2D. The display layer 120 in FIG. 2D is deemed to include the liquid crystal portion 121 and the first and second seal portions 122-1 and 122-2, but not the first and second sealing material layers 123 and 124. This is different from the display layer member 120*a* in FIG. 1, which in addition to the liquid crystal portion 121 and the seal member 122, also includes the first and second sealing material layers 123 and 124. This discrepancy is only an arbitrary choice of organizing subcomponents.

It is appreciated that after the cover glass panel 210 is placed upon the display layer 120, the space 205 is now fully enclosed or bounded (but not fully enclosed) between the first and second seal portions 122-1 and 122-2, as well as the first and second sealing material layers 123 and 124, as shown in FIG. 2D, It is also appreciated that this space 205 is situated directly on top of the conductive pad 132.

Figure 2E:
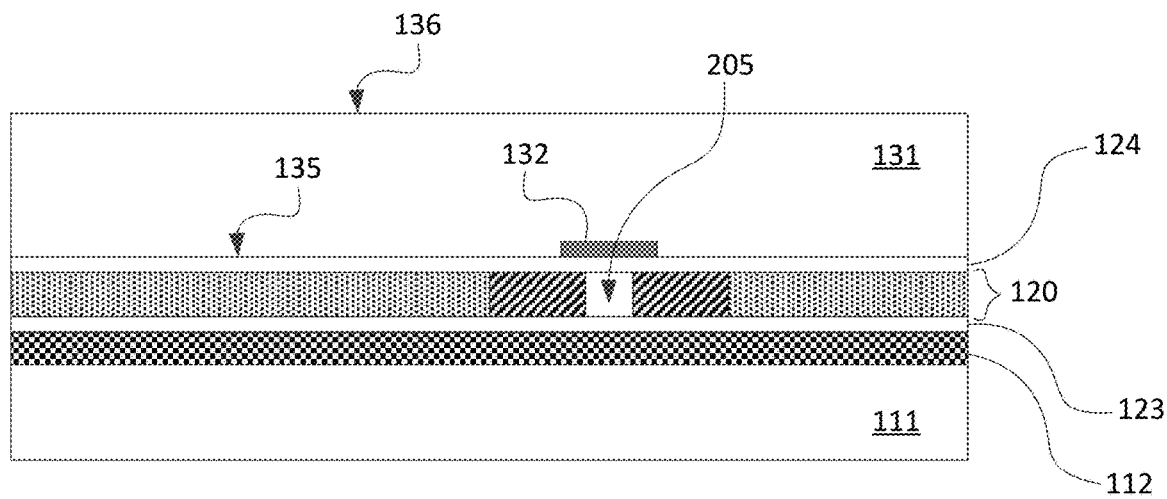

Next, the structure formed in FIG. 2D is flipped upside down, with the resulting structure shown in FIG. 2E. It is appreciated that the second surface 136 of the silicon substrate 131 now faces upward. The next few steps aim to singulated the cover glass panel 210 (including the cover glass 111, the transparent electrode layer 112, and the first sealing material layer 123), the display layer 120, and the silicon substrate 131, through the space 205. Each of these steps is disclosed herein.

Figure 2F:
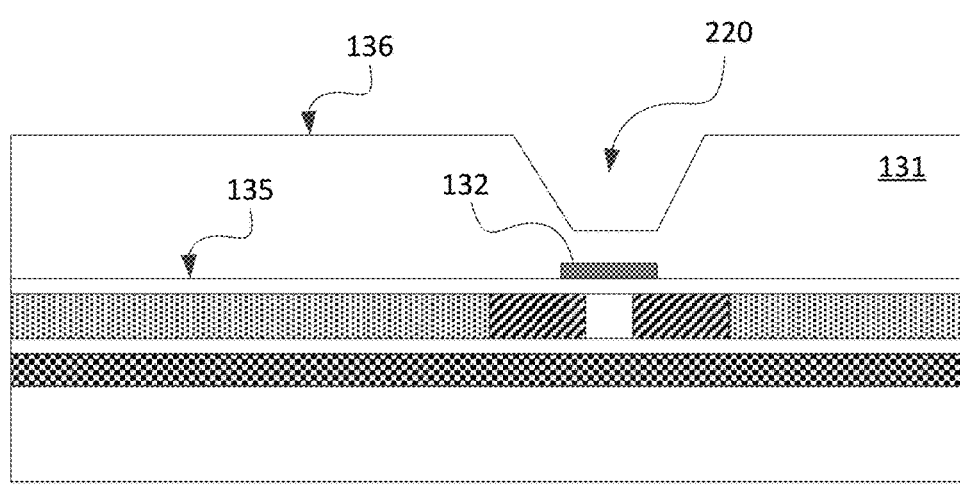

In FIG. 2F, a shallow notch 220 is formed on the second surface 136 of the silicon substrate 131, toward the first surface 135. This shallow notch 220 may be formed by a cutting tool such as a die saw. It is appreciated that the shallow notch is situated directly on top of the conductive pad 132, but is not deep enough to reach and expose the conductive pad 132.

Figure 2G:
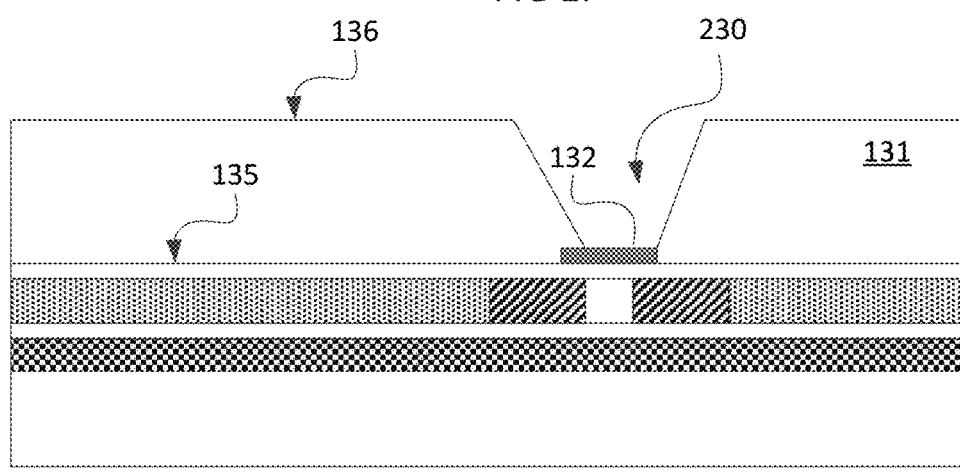

Subsequently in FIG. 2G, the shallow notch 220 is deepened toward the conductive pad 132 (and the first surface 131), such that a deep notch 230 is formed as a result. This deepening of the shallow notch 220 may be accomplished by a process such as dry or wet etching, which is more controllable than cutting with a die saw. The result of this controlled deepening is that the conductive pad 132 is now exposed at the bottom of the deep notch 230, as shown in FIG. 2G.

Figure 2H:
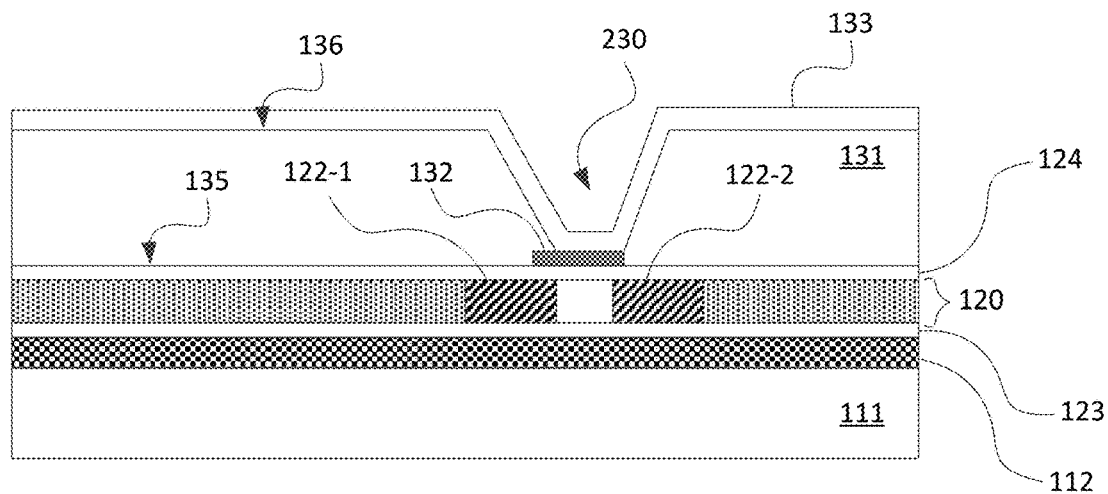

Next in FIG. 2H, an isolation layer of insulating material 133 is formed on the second surface 136 of the silicon substrate 131. This isolation layer 133 is formed over the entirety of the second surface 136, to cover the deep notch 230 and the conductive pad 132, as shown in FIG. 2H. The insulating material 133 may be a non-conductive material, such as a black solder mask (BSM), which is typically a resin. The isolation layer of insulating material 133 provides electrical insulation to the silicon substrate 131.

Figure 2I:
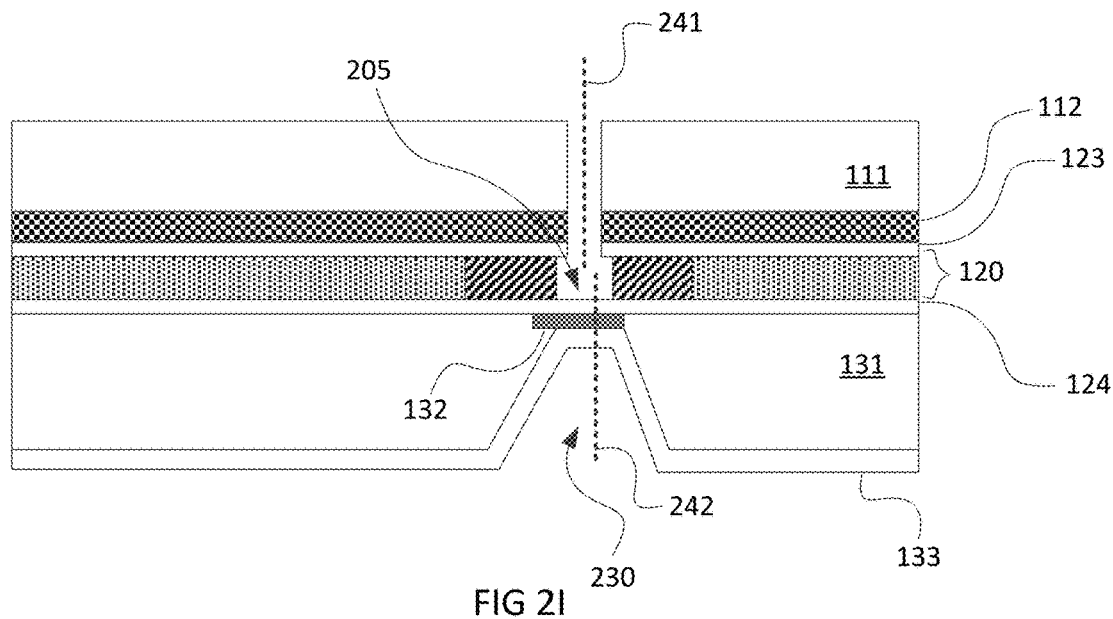

Next in FIG. 2I, a complete separation is performed on the structure of the structure of the previous FIG. 2H, which is now inverted to have the cover glass 111 situated above the silicon substrate 131. The separation is made in two places. First, a cut, exemplarily performed by a die saw in a cutting line 241, is made through the cover glass 111, the transparent electrode layer 112, and the first sealing material layer 123, into the space 205, as shown in FIG. 2I. Second, a separation, exemplarily performed by breaking or sawing in a separation line 242, is made through the deep notch 230, and separates the isolation layer 133, the conductive pad 132, and the second sealing material layer 124, as shown in FIG. 2I. The result is the complete separation of the overall structure in FIG. 2I into a left portion and a right portion. Further processing is then performed on either or both of the two portions, as disclosed herein.

Figure 2J:
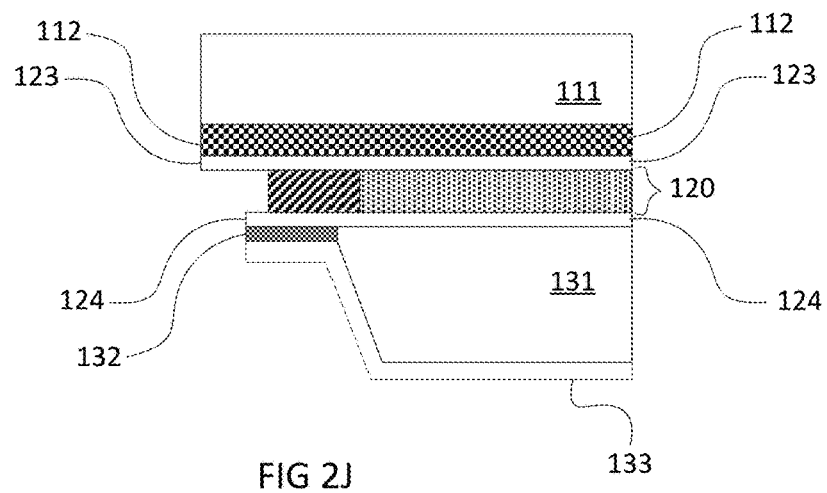

FIG. 2J shows the right portion produced as a result of the complete separation as depicted in FIG. 2I. What needs to be done now is to make an electrical coupling of the transparent electrode layer 112 and the conductive pad 132. This may be done by dispensing a conductive material to couple these two parts. As shown in FIG. 2J, the transparent electrode layer 112 and the conductive pad 124 are fully covered at their top and bottom sides by non-conducting first and second sealing material layers 123 and 124 made of PI, and are only exposed at their sides. Optional steps may be taken to enlarge heir uncovered and exposed areas, as disclosed in the subsequent FIG. 2K. It is appreciated that the structure in FIG. 2K is the same structure in FIG. 2J being turned upside down, with the cover glass 111 now positioned below the silicon substrate 131.

Figure 2K:
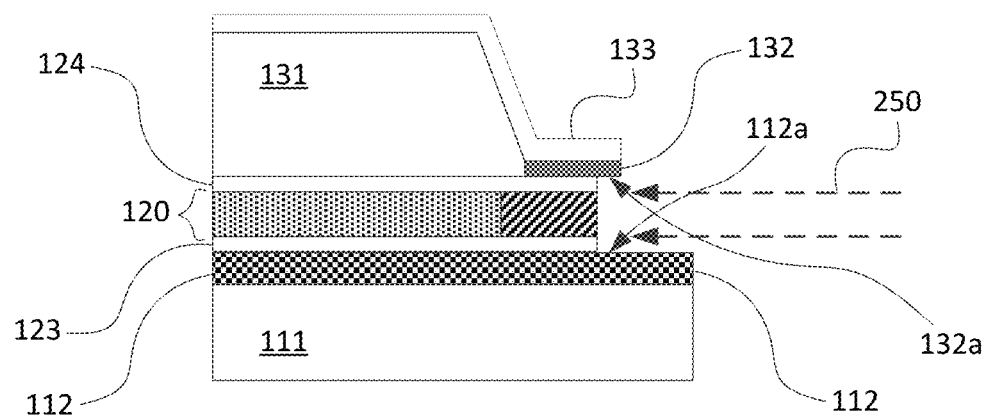
Figure 2L:
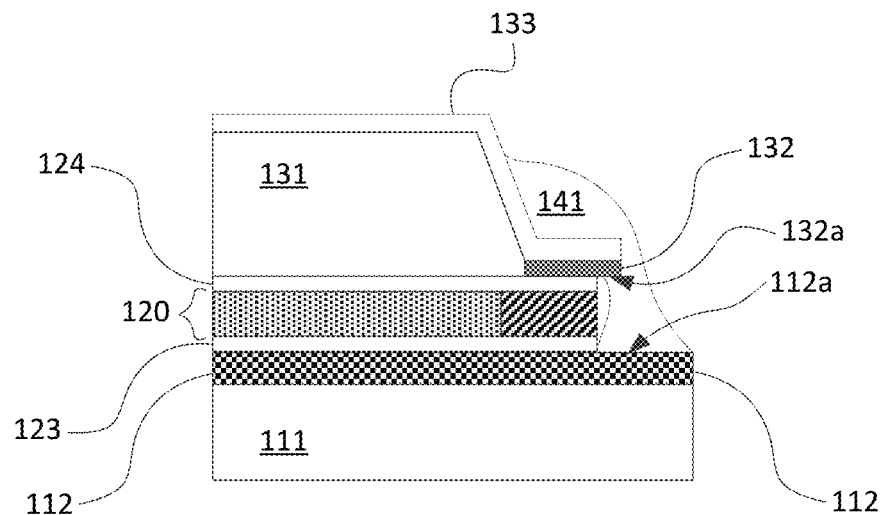

FIG. 2K shows an optional step of using a removal technique in a direction 250 to remove a portion of the first sealing material layer 123 to expose a first transparent electrode layer portion 112*a,* and also to remove a portion of the second sealing material layer 124 to expose a second conductive pad portion 132*a*. As a result, both the transparent electrode layer 112 and the conductive pad 132 now have increased conductive areas 112*a* and 132*a* that are exposed to make a subsequent electrical coupling.

Figure 2M:
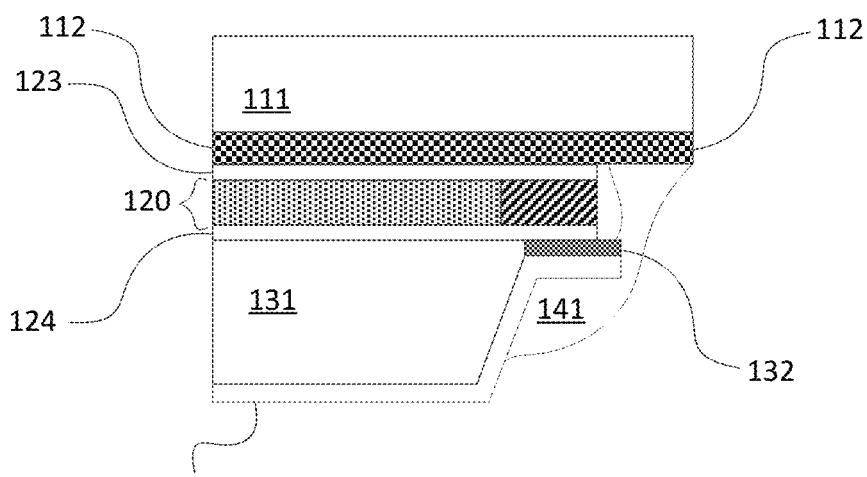

It is appreciated that the removal technique in FIG. 2K may be exemplified by etching. For example, a plasma based dry etching is advantageous in controlling the etching time to remove portions of the first and second sealing material layers 123 and 124, which are made of polyimide (PI), while leaving other parts relatively intact. In another example, a chemical etching employs metal protector chemical markers added into an etching solution, so that etching rate slows down after PI (in the first and second sealing material layers 123 and 124) is removed and the metal (in the contact pad 132) and the ITO (in the transparent electrode layer 112) are exposed. This goal is achieved by the metal protector chemical markers adhering to the aforementioned metal and ITO. The overall result is the removal of portions of the first and second sealing material layers 123 and 124, which are made of polyimide (PI), while leaving the other parts (metal and ITO) relatively intact Finally in FIG. 2L, a conductive adhesive 141 is dispensed to couple the conductive pad 132 (especially at its exposed portion 132*a*) with the transparent electrode layer 112 (especially at its exposed portion 112*a*). Afterwards, the conductive adhesive 141 may set, for example, by hardening overtime or being solidified by an ultraviolet (UV) light. FIG. 2M is the resulting structure in FIG. 2L turned upside down. The structure in FIG. 2M is essentially the same as the portion of the structure in the dotted line box 100A in FIG. 1.

Several aspects of the aforementioned LCOS manufacturing method are appreciated. First, as shown in FIG. 2D, the space 205 is created to be enclosed or bounded (but not fully enclosed) by the two seal portions 122-1 and 122-2, as well as the first and second sealing material layers 123 and 124. This enclosed or bounded space 205 facilitates the singulation process as shown in FIG. 2I, for example, by obviating the need to cut either seal portion 122-1 or 122-2.

Second, as shown in FIGS. 2F-2H, the deep notch 230 is formed in the silicon substrate 131 in a controlled manner to leave the conductive pad 132 intact. This deep notch 230 also facilitates the singulation process as shown in FIG. 2I, for example, by reducing the amount of the silicon substrate that needs to be cut through.

Third, the first and second sealing material layers 123 and 124 are formed continuously throughout the transparent electrode layer 112 and the silicon substrate 131, respectively. For example, FIG. 2B shows that the second sealing material layer 124 is formed continuously throughout the entirety of the first surface 135 of the silicon substrate 131. This facilitates the ease of the LCOS manufacturing process, vis-á-vis forming the sealing material layers as non-continuous patches. The fact that the first and second seal portions 122-1 and 122-2 rest upon the second sealing material layer 124 also facilitates the tightness of forming a tight seal of the liquid crystal portions 121, as shown in FIG. 2D. On the other hand, because the first and second sealing material layers 123 and 124 are continuous, there is a need to remove portions of them by selective etching as shown in FIG. 2K, in order to create more exposed conductive surfaces (112a and 132a) of the transparent electrode layer 112 and the conductive pad 132 for better electrical coupling by the conductive adhesive 141 seen in FIG. 2L.

Alternative LCOS Manufacturing Method Embodiment

FIGS. 3A through 3E show cross sectional side views of the steps of an alternative exemplary embodiment of an LCOS device manufacturing process, specifically forming an electrical coupling between the transparent electrode layer 112 and the second conductive pad 132-2 on a silicon substrate 131 as shown in FIG. 1. It is appreciated that the numbering of some parts in FIGS. 3A through 3E are the same as in FIG. 1. This is meant to indicate that the same part numbers in FIGS. 3A-3E and FIG. 1 denote the same part entity.

Figure 3A:
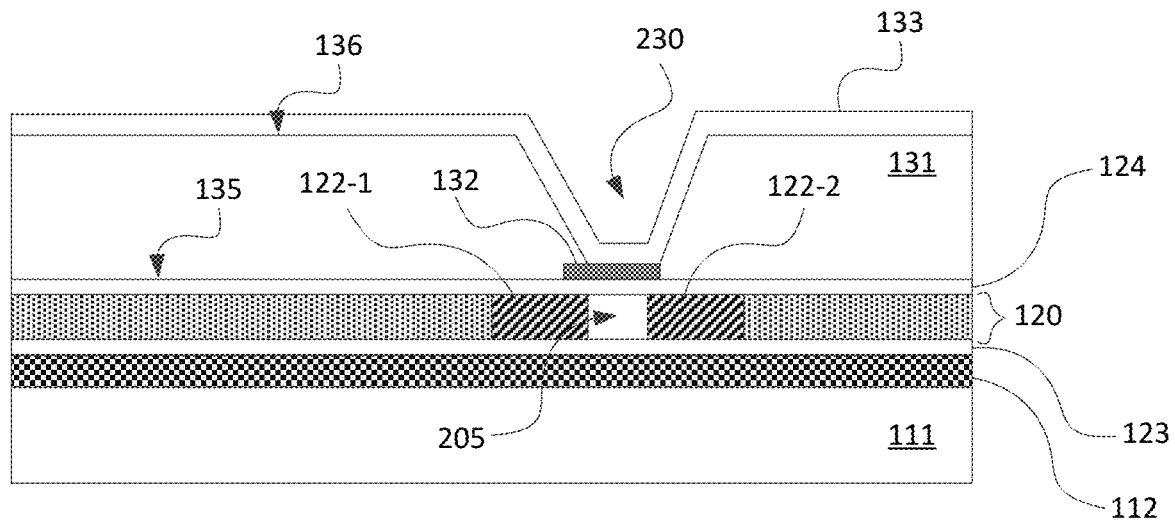
FIGS. 3A through 3E are cross sectional side views of an alternative exemplary embodiment of an LCOS device manufacturing process, specifically forming an electrical coupling between a transparent electrode layer and a conductive pad on a silicon substrate.

It is appreciated for this alternative exemplary method, a first number of steps are the same as those depicted in previously disclosed FIGS. 2A-2H (partial sequence) of FIGS. 2A-2M (fill sequence). Specifically, FIG. 3A, which is the first figure of the current sequence of FIGS. 3A-3E, is the same as FIG. 2H, which is the last figure of the previous partial sequence of FIG. 2A-2H. FIGS. 3B-3E are different from the previously disclosed FIGS. 2I-2M. Accordingly, the first number of steps of this alternative exemplary method leading up to (i.e., before) FIG. 3A are omitted to avoid redundancy.

Figure 3B:
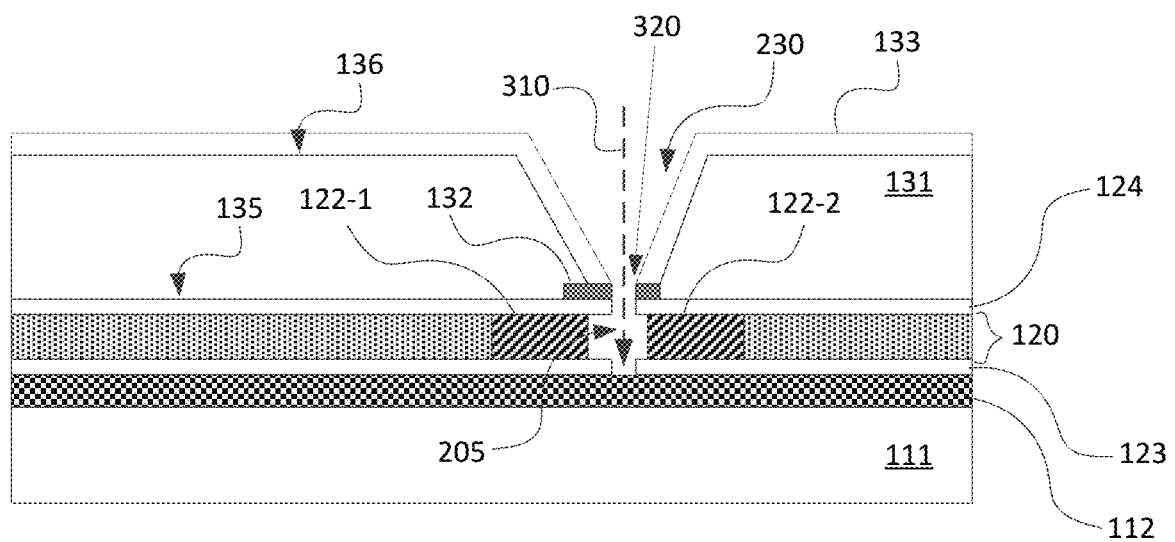

FIG. 3A is the same as FIG. 2H. Next, as shown in FIG. 3B, an aperture 320 is created through the isolation layer 133, and its underlying conductive pad 132 and second sealing material layer 124 to reach the space 205. It is appreciated that the aperture 320 may be formed by mechanical or laser drilling to reach the space 205. It is also appreciated that, once the space 205 is reached, laser drilling may be applied to remove a portion of the first sealing material layer 123 made of polyimide (PI), while leaving the underlying transparent electrode layer 112 made of ITO relatively intact. The removal of the portion of the first sealing material layer 123 facilitates the exposure of some area of the transparent electrode layer 112 for a better electrical coupling in subsequent steps.

Figure 3C:
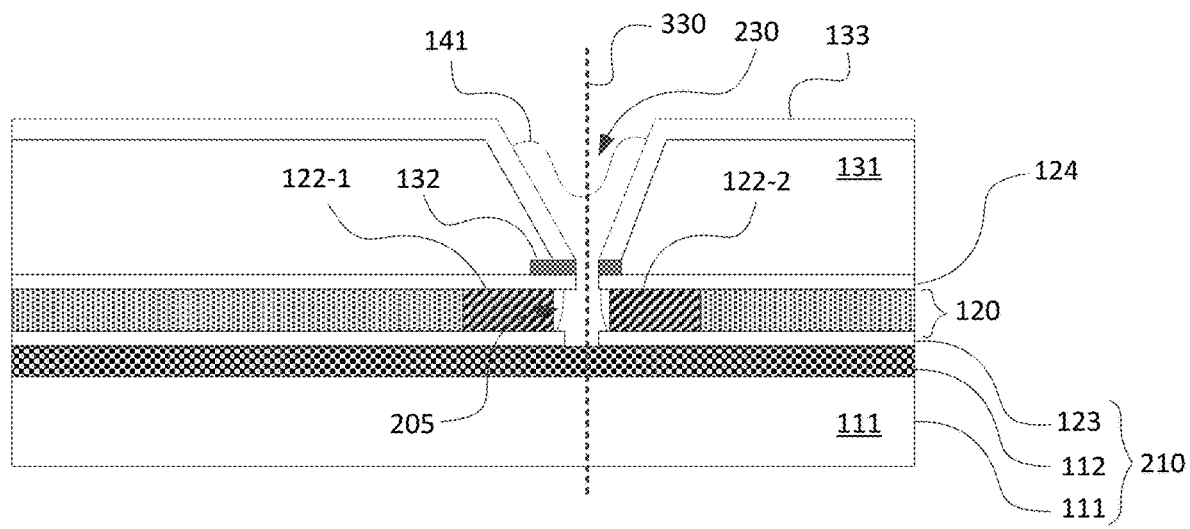

Next in FIG. 3C, a conductive adhesive 141 is injected or otherwise dispensed through the aperture 320 into the space 205. Sufficient amount of the conductive adhesive 141 is dispensed to form an electrical coupling between the conductive pad 132 and the transparent electrode layer 112. Once the conductive adhesive 141 sets, for example, either solidifying over time or having been hardened by an ultraviolet (UV) light, a singulation is performed along a cutting line 330, into the deep notch 230, and through the space 205 between the first and second seal portions 122-1, 122-2, together with the silicon substrate 131, the display layer 120, and the cover glass panel 210 (including the cover glass 111, the transparent electrode layer 112, and the first sealing material layer 123). This singulation may be performed, for example, by a die saw. The result is a complete separation of the overall structure in FIG. 3C into a left portion and a right portion.

Figure 3D:
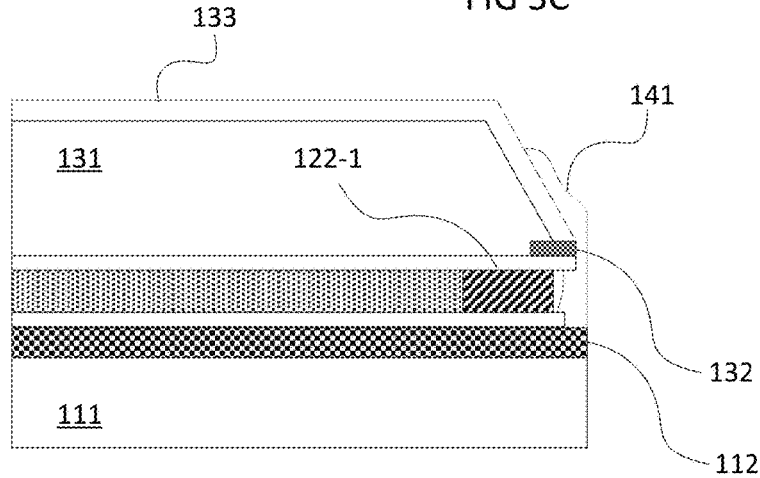
Figure 3E:
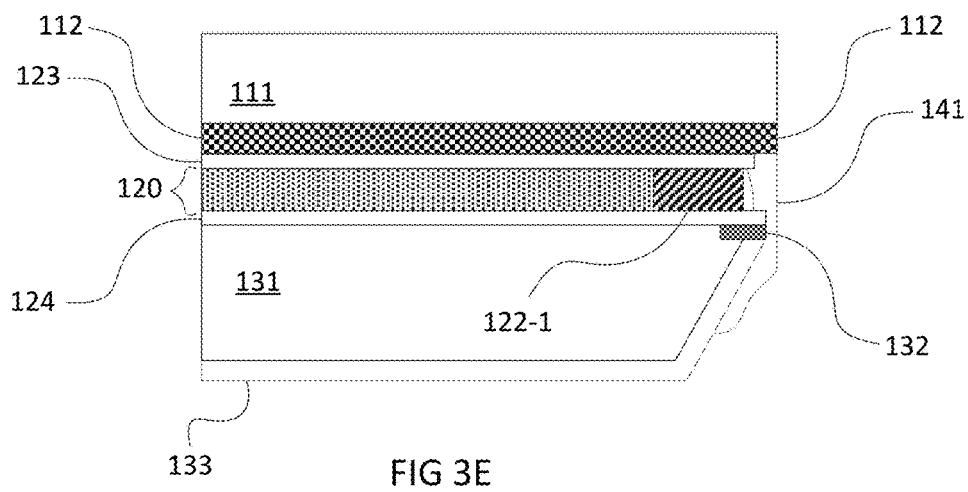

FIG. 3D shows the left portion after the separation in FIG. 3C. FIG. 3E shows the same structure as in FIG. 3D, but is turned upside down. The structure in FIG. 3E is essentially the same as the portion of the structure in the dotted line box 100A in FIG. 1.

Several aspects of the aforementioned alternative LCOS manufacturing method are appreciated. These are similar to the method as depicted in FIGS. 2A-2M, but several additional points need to be mentioned. First, an electrical coupling between the conductive pad 132 and the transparent electrode layer 112 is formed before the singulation of the cover glass panel 210, the display layer 120, and the silicon substrate 131. This is opposite to other methods, and is a unique aspect of this alternative LCOS manufacturing method. Second, laser drilling may be used to remove a part of the first sealing material layer 123 made of PI, as shown in FIG. 3C. In the other method shown in FIG. 2K, plasma or wet chemical etching is used to remove the same PI layer material.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A liquid crystal on silicon (LCOS) panel, comprising:
a silicon substrate including a first surface and a second surface; further including a first conductive pad and a second conductive pad at the first surface;
a display layer including a liquid crystal portion, and a seal surrounding the liquid crystal portion;
a cover glass panel including a cover glass, and a transparent electrode layer formed upon the cover glass;
a printed circuit board (PCB) including a bonding pad, at least one solder ball, and at least one internal connection connecting the bonding pad to the solder ball;
a conductive member coupling the first conductive pad to the bonding pad; and
a conductive adhesive coupling the second conductive pad to the transparent electrode layer;
wherein the display layer is situated between the first surface of the silicon substrate and the transparent electrode layer of the cover glass panel, and wherein the second surface of silicon substrate is situated upon the PCB.

2. The LCOS panel of claim 1, wherein the display layer further includes a first sealing material layer and a second sealing material layer, wherein the liquid crystal and the seal is situated between the first seal material layer and the second sealing material layer.

3. The LCOS panel of claim 2, further including an encapsulating material covering the conductive member, the first conductive pad, and the bonding pad.

4. The LCOS panel of claim 3, further comprising an isolation layer of insulating material formed on the second surface of the silicon substrate.

\* \* \* \* \*